Oct. 29, 1968  G. STEIN  3,407,737
PUMP WITH VARIABLE VOLUME AND DIRECTIONAL CONTROL
Filed Dec. 5, 1966  2 Sheets-Sheet 1
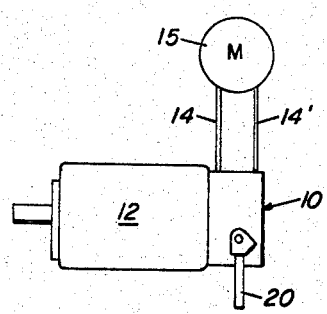
FIG.1
FIG.2
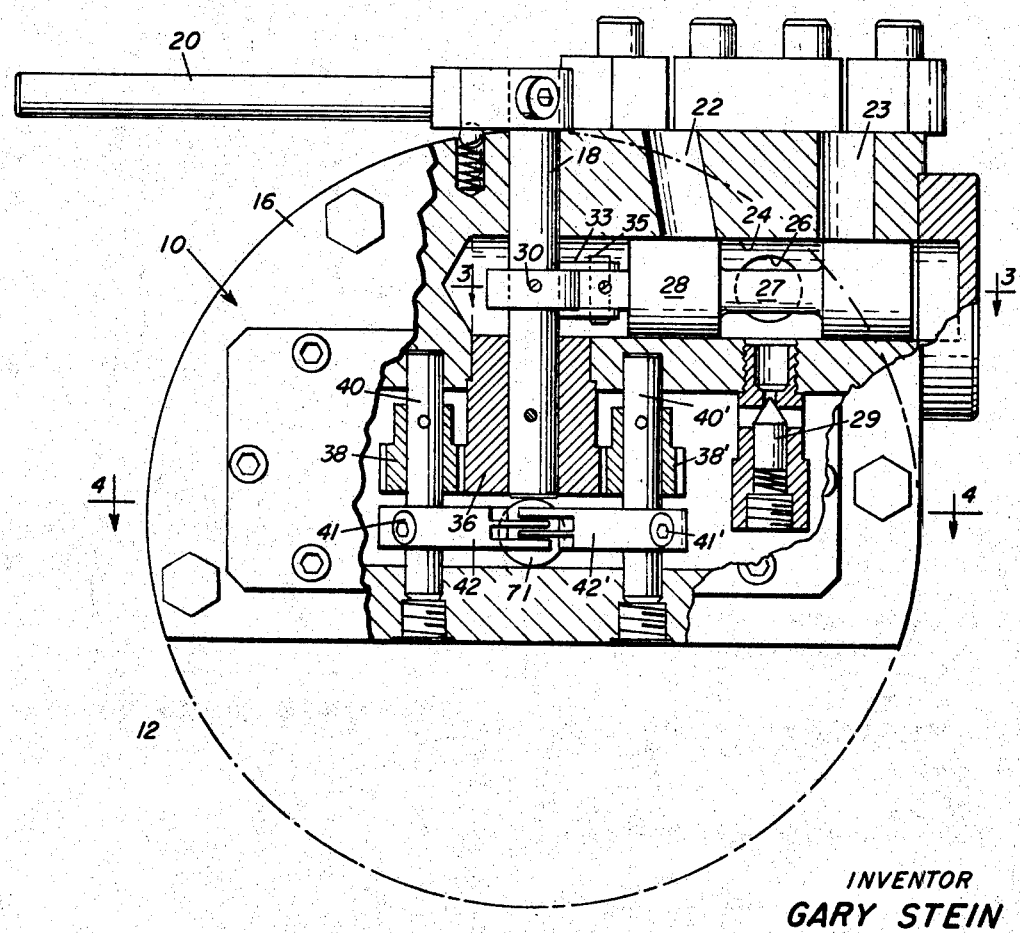
INVENTOR
GARY STEIN
BY *Robillard and Byrne*
ATTORNEYS United States Patent Office 3,407,737
Patented Oct. 29, 1968

3,407,737
PUMP WITH VARIABLE VOLUME AND
DIRECTIONAL CONTROL
Gary Stein, Brookfield, Wis., assignor to Applied Power
Industries, Inc., Menomonee Falls, Wis., a corporation
of Wisconsin
Filed Dec. 5, 1966, Ser. No. 599,137
4 Claims. (Cl. 103—2)

ABSTRACT OF THE DISCLOSURE

Disclosed herein is a hydraulic pump of the axial piston type wherein there is provided a single control lever for varying fluid flow (displacement) and direction of flow to the motor system by a single motion of the aforementioned lever.

Hydraulic pumps wherein the angle between the piston barrel and the cam plate is variable by a control lever to control both output and direction of flow have been successfully used in the prior art for many years. Efficient, variable volume pumps having a fixed angle cam plate have heretofore, however, required a dual valving and lever system for obtaining both direction and output control. It is one object of this invention to provide a single lever control to vary both the direction and level of the output of a hydraulic pump having a fixed cam angle by furnishing a valve to change direction by movement thereof from one extreme to another and means movable therewith to provide constant variation in the level of output regardless of the direction of the movement of the valve.

It is another object of this invention to provide a single handle control means for a fluid pump of the type described which operates in one range to pump fluid in one direction while varying the displacement thereof throughout that range and which operates in another range to pump fluid in an opposite direction while varying displacement thereof throughout the other range.

It is still another object of this invention to provide a pump control linkage mechanism through which a valve may be moved to either side of a neutral position to vary the direction of fluid exhaust from a pressure source while the linkage at the same time, providing linear motion of a fluid volume regulating means which regulation will be identical with the valve on either side of the neutral point.

These and other objects of this invention will become better understood by those skilled in the art by reference to the following detailed description when viewed in light of the accompanying drawings wherein like elements throughout the figures thereof are indicated by like numerals and wherein:

FIGURE 1 is a diagrammatic view of the environment in which the control assembly of the invention finds use;

FIGURE 2 is an end view partly in section of the control assembly;

Figure 3:
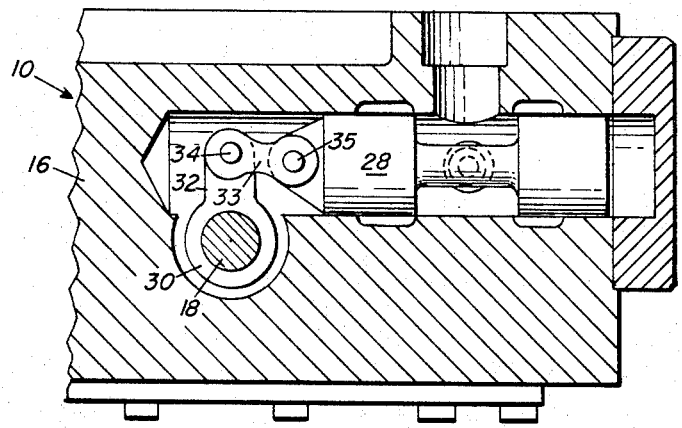
FIGURE 3 is a sectional view taken along the lines 3—3 of FIGURE 2.

Referring now to the drawings and more particularly to FIGURE 1, the control assembly indicated generally at 10, is mounted on the housing of the pump 12. The pump is of the variable capacity, fixed angle cam plate type such for example, as that disclosed in U.S. Patent Re. 25,850 to Philip G. Stewart, reissued on Sept. 7, 1965. In this type of pump, lineal movement of an output control shaft varies the pump displacement by bypassing varying amounts of fluid according to the actions of an eccentric whose position is determined by the lineal position of the shaft. Although in the Stewart patent longitudinal position is determined by a rotary motion, this positioning can be set directly lineally. For purposes of this disclosure, it should be assumed that the shaft 71 is biased outwardly to a zero output position and output increases as shaft 71 is pushed inwardly. Reversal of fluid in this type of pump is effectuated by separate valving systems.

With reference now to FIGURE 2, the control of assembly 10 comprises a housing 16, secured to one end of the pump 12. The housing 16 is disposed over an output shaft 71 of a type similar to that shown in the above-mentioned Stewart patent. A shaft 18 is rotatably received through the housing 16 and has rigidly secured to the upper end thereof an operator control handle 20.

Passageways 22 and 23, formed in the housing 16, communicate with lines 14 and 14' respectively. The passageways at their inner ends are communicated with one another through a transverse bore 24 disposed in the interior of the housing. A pump manifold outlet 26 communicates with the bore 24 intermediate passageways 22 and 23. A spool valve 28 is slidably disposed in bore 24 provided with an intermediate portion 27 of reduced diameter the length of which is greater than the distance between the outlet 26 and either passageways 22 or 23. The direction of flow to motor 15 from pump outlet 26 is selected by the position of spool valve 28. For example, the movement of the spool valve toward the left past the neutral point of FIGURE 2 will direct fluid from the pump to outlet 22 and thus through conduit 14, while movement of the valve toward the right past neutral will direct fluid flow to the outlet 23 and conduit 14'. This reversal in communication with the outlets will result in reversal of fluid flow to the motor 15 and thereby provide reversal in direction of operation of the motor.

A safety valve 29, in communication with the bore 24 and the fluid reservoir of the hydraulic system is normally biased to block flow to the tank during normal pressure operation but is so designed to prevent damage to the pump when the spool is in its neutral position.

With specific reference to FIGURE 3, a collar 30, having an extension 32, is shown fixedly secured to the shaft 18. A linkage member 33, pivotally connected to the extension 32 at one end by a pin 34 and at the other end to the spool valve 28 by pin 35, provides a linkage between the shaft 18 and the spool valve 28. Thus a rotational movement of handle 20 will result in linear movement of the spool valve in the bore 24 and thereby control the direction of fluid flow to the motor.

Referring again to FIGURE 2 of the drawings, a central spur gear 36 is shown fixed to the lower end of the shaft. This gear meshes with two outer spur gears 38 and 38'. The gears 38 and 38' are fixedly mounted on shafts 40 and 40'. Cam members 42 and 42' are carried at the lower ends of the shafts 40 and 40' respectively by set screws 41 and 41'. The adjacent ends of the cams 42 and 42' are formed with interleaving extensions 43 and 43' and thereby avoid interference with one another in the position shown in FIGURE 2.

The cams 42 and 42' are shown in their neutral position by the solid lines. The cams lie adjacent the end of the variable output shaft 71 which, in turn controls pump output by controlling the amount of fluid bypassed.

Figure 4:
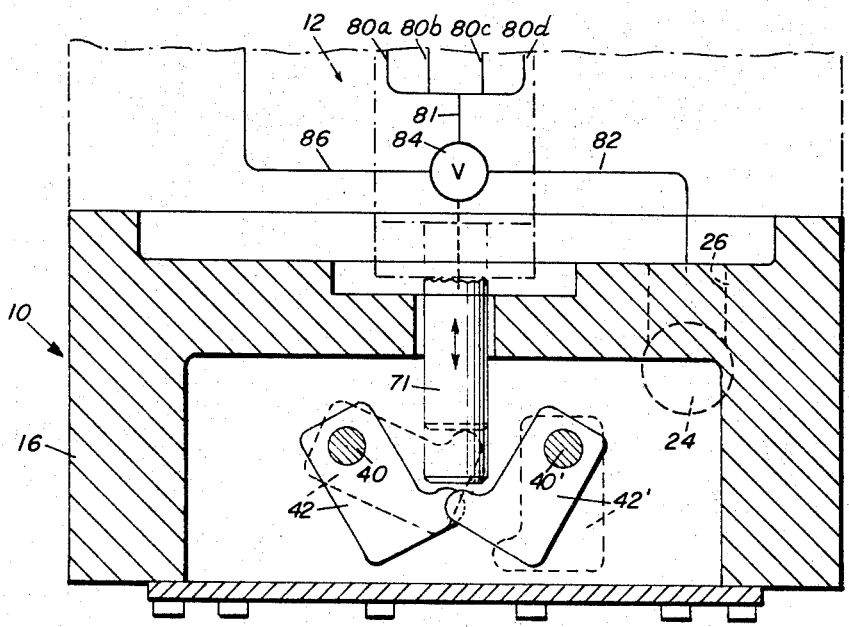
FIGURE 4 is a sectional view taken along the lines 4—4 of FIGURE 2.

As an example of a bypass different than that shown in the above-identified Stewart patent, an arrangement for varying fluid output flow by bypass means is shown in schematic in FIGURE 4. Assuming that the pump 12 is a multi-piston pump, fluid piston output lines 80a through 80d from each of the pistons are manifolded to a single line 81 which communicates with a flow dividing valve 84. The valve 84, in turn, communicates with a bypass line 86 and the bore 24 through a conduit and the piston manifold 26. The bypass 86 communicates with the inlet chamber of the pump (not shown) to recirculate fluid through the pump. A flow dividing valve of this type has an inlet and a pair of outlets, the valve mechanism operating to regulate flow from full flow to one outlet, through varying degrees of divided flow between the outlets to full flow through the other outlet. The valve mechanism is mechanically connected to the shaft 71 in such a manner that axial movement of the shaft 71 actuates the mechanism for variation of the flow and thereby varies the bypass flow through line 86 from a maximum to a minimum, consequently varying the output of the pump through the conduit 82 from a minimum with the member 71 in the condition shown in solid lines to maximum with the member in the position shown in phantom lines. Another arrangement to be encompassed by this invention would be as a control for a tilting cam plate to vary output.

In operation, actuation of handle 20 to rotate the shaft 18 in a clockwise direction (FIGURE 3) moves the valve 28 toward the right as shown in FIGURE 2 thereby directing flow from the outlet 26 to the outlet 23. Simultaneously, the gears 38 and 38' will rotate in a counterclockwise direction thereby rotating cams 42 and 42' in a counterclockwise direction (FIGURE 4) causing the cam 42' to engage the member 71 and move it axially into the pump thereby increasing the flow from a minimum or zero to a maximum. When the handle is moved to rotate the shaft 18 in a counterclockwise direction, movement of the valve 28 is to the left, past neutral putting the outlet 26 into communication with the outlet 22 thereby reversing the direction of flow. Simultaneously, the gears 38 and 38' and the cams 42 and 42' are rotated in a clockwise direction (FIGURE 4) so that the cam 42 engages the end of the shaft 71 and, as is shown in phantom lines, moves it axially into the pump to increase the rate of flow from zero or minimum to a maximum. It can thus be seen that, regardless of the direction of rotation of the shaft 18, the flow volume is varied at an identical rate on either side of neutral.

What tas been set forth above is intended primarily as exemplary of a teaching of the invention to enable those skilled in the art in the practice thereof and it should, therefore, be understood that within the scope of the appended claims the invention may be practiced in other ways than as specifically described.

What is new and desired to be protected by Letters Patent of the United States is:

1. A fluid power device for pressuring a fluid and transmitting pressurized fluid to a hydraulic motor system and having a member movable in a first direction to increase the fluid output from said device and movable in a second direction to decrease the fluid output from said device wherein the improvement comprises first and second outlet passageways formed in said device, a valve for directing the pressurized fluid to either said first or second passageway, an operating stem rotatably received in said device, linkage means pivotally connected at one end to said stem and at the other end to said valve for moving said valve to divert said fluid to said first outlet passageway as said stem is rotated in one direction and to said second outlet passageway as said stem is rotated in a direction counter to said one direction, cam means pivotally mounted in said device engaging said member, and gear means connecting said stem and said cam means for simultaneously moving said member in said first direction when said stem is rotated in either direction.

2. The device recited in claim 1 wherein said device is formed with an elongated chamber, said valve slidably received in said chamber, a bore intersecting said chamber intermediate its length, said first and second passageways intersecting said chamber on either side of said bore and said valve having an area of reduced cross section for alternatively communicating said bore with either said first or second passageways.

3. The device as recited in claim 1 wherein said gear means comprise a first gear rigidly mounted on said stem, a first shaft rotatably mounted in said device, a second shaft rotatably mounted in said device, a second gear rigidly mounted on said first shaft and intermeshing with said first gear, and a third gear rigidly mounted on said second shaft intermeshing with said first gear.

4. The device as recited in claim 3 wherein said cam means comprises a first cam mounted on said first shaft and a second cam mounted on said second shaft, said intermeshing gears causing one of said cams to move said member in said first direction when said stem is rotated in either direction.

References Cited

UNITED STATES PATENTS

| | | | |
|---|---|---|---|
| 2,867,091 | 1/1959 | Orloff et al. | 60—52 X |
| 2,903,852 | 9/1959 | Bottoms | 60—52 X |
| 2,932,948 | 4/1960 | Neff et al. | 60—52 |
| 2,945,449 | 7/1960 | Le Febvre et al. | 60—52 X |
| 3,107,490 | 10/1963 | Cooper et al. | 60—52 X |
| 3,157,173 | 11/1964 | Martyn et al. | 103—41 X |
| 3,161,137 | 12/1964 | Thoma et al. | 103—41 |
| 3,171,255 | 3/1965 | Lauck | 103—41 X |
| 3,180,091 | 4/1965 | Bruno | 60—52 |
| 3,217,493 | 11/1965 | Kempson et al. | 60—52 |

FRED C. MATTERN, JR., *Primary Examiner.*

W. J. KRAUSS, *Assistant Examiner.*